United States Patent [19]

Nishiwaki

[11] Patent Number: 5,841,101
[45] Date of Patent: Nov. 24, 1998

[54] METHOD USED IN MANUFACTURING A WORKPIECE USING A PLURALITY OF SPACED APART MASK PATTERNS

[75] Inventor: Masayuki Nishiwaki, Kawaguchi, Japan

[73] Assignee: Canon Kabushiki Kaisha, Tokyo, Japan

[21] Appl. No.: 575,679

[22] Filed: Dec. 19, 1995

[30] Foreign Application Priority Data

Dec. 27, 1994 [JP] Japan ..................................... 6-340387

[51] Int. Cl.$^6$ .................................................. B23K 26/06
[52] U.S. Cl. ............................... 219/121.71; 219/121.73; 219/121.77; 219/121.85
[58] Field of Search ........................... 219/121.7, 121.71, 219/121.73, 121.75, 121.76, 121.77, 121.85; 29/890.1; 264/400; 347/47; 355/53, 67, 71; 362/259

[56] References Cited

U.S. PATENT DOCUMENTS

| | | |
|---|---|---|
| 4,653,903 | 3/1987 | Torigoe et al. . |
| 4,682,885 | 7/1987 | Torigoe . |
| 4,683,524 | 7/1987 | Ohta . |
| 4,851,978 | 7/1989 | Ichihara . |
| 5,263,250 | 11/1993 | Nishiwaki et al. . |
| 5,378,137 | 1/1995 | Asakawa et al. ............... 219/121.71 X |
| 5,463,200 | 10/1995 | James et al. .................... 219/121.77 X |

FOREIGN PATENT DOCUMENTS

| | | |
|---|---|---|
| 0-066432 | 12/1982 | European Pat. Off. . |
| 0 454 152 A1 | 10/1991 | European Pat. Off. . |
| 0 660 158 A2 | 6/1995 | European Pat. Off. . |
| 1765145 | 5/1973 | Germany .......................... 219/121.77 |
| 57-181873 | 11/1982 | Japan . |
| 61-23592 | 2/1986 | Japan . |
| 62-2540 | 1/1987 | Japan . |
| 62-115718 | 5/1987 | Japan . |
| 62-115719 | 5/1987 | Japan . |
| 63-177982 | 7/1988 | Japan ............................... 219/121.73 |
| 1-313196 | 12/1989 | Japan . |
| 4-9293 | 1/1992 | Japan . |
| 5-138376 | 6/1993 | Japan ............................... 219/121.75 |
| 5-261583 | 10/1993 | Japan ............................... 219/121.73 |
| WO 93/15911 | 8/1993 | WIPO . |

OTHER PUBLICATIONS

Anonymous. "Prism Deflector for Laser Machining", IBM Technical Disclosure Bulletin, vol. 8, No. 6, Nov. 1965, p. 882.

Proceedings of the IEEE, vol. 57, No. 2, Feb. 1969, pp. 114–147, Gagliano, et al., "Lasers in Industry".

Xerox Disclosure Journal, vol. 4, No. 2, Mar./Apr. 1979, pp. 251–252, Gardner, "Process for Fabrication of Ink Jet Orifices".

Laser Und Optoelektronik, vol. 20, No. 2, Apr. 1988, Stuttgart, W.Germany, pp. 96–101, Sowada, et al., "Excimer Laser Material Processing . . . ".

IBM Technical Disclosure Bulletin, vol. 17, No. 5, Oct. 1974, pp. 1523, Lane, et al., "Making Multi–Ink Jet Nozzles and Charging Structures From a Single Sheet of Machinable Plastic".

Primary Examiner—Gregory L. Mills
Attorney, Agent, or Firm—Fitzpatrick, Cella, Harper & Scinto

[57] ABSTRACT

A method used in manufacturing a workpiece using a plurality of spaced apart mask patterns includes two dividing steps and two focusing steps. The first step divides a light beam emitted from a light source into a plurality of light beams on a first plane including a first axis. A second step divides each of the plurality of light beams into a plurality of light beams on a second plane perpendicular to the first plane, the second plane including a second axis perpendicular to the first axis. A third step focuses the plurality of light beams produced by the second step only in the first direction. A fourth step focuses the plurality of light beams focused in this third step in the first direction at a position beyond the plurality of mask patterns in the second direction so that the light beams focused in the third step overlap each other to perform a plurality of spaced apart images, each of which illuminate one of the plurality of spaced apart mask patterns.

12 Claims, 4 Drawing Sheets

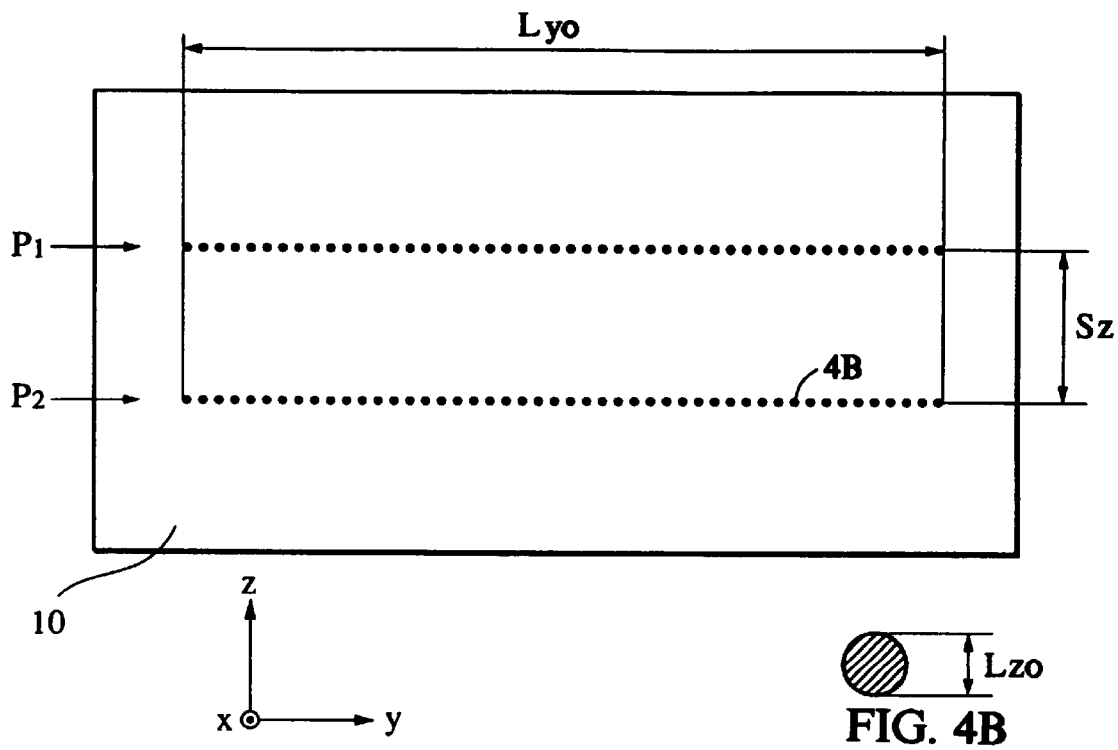
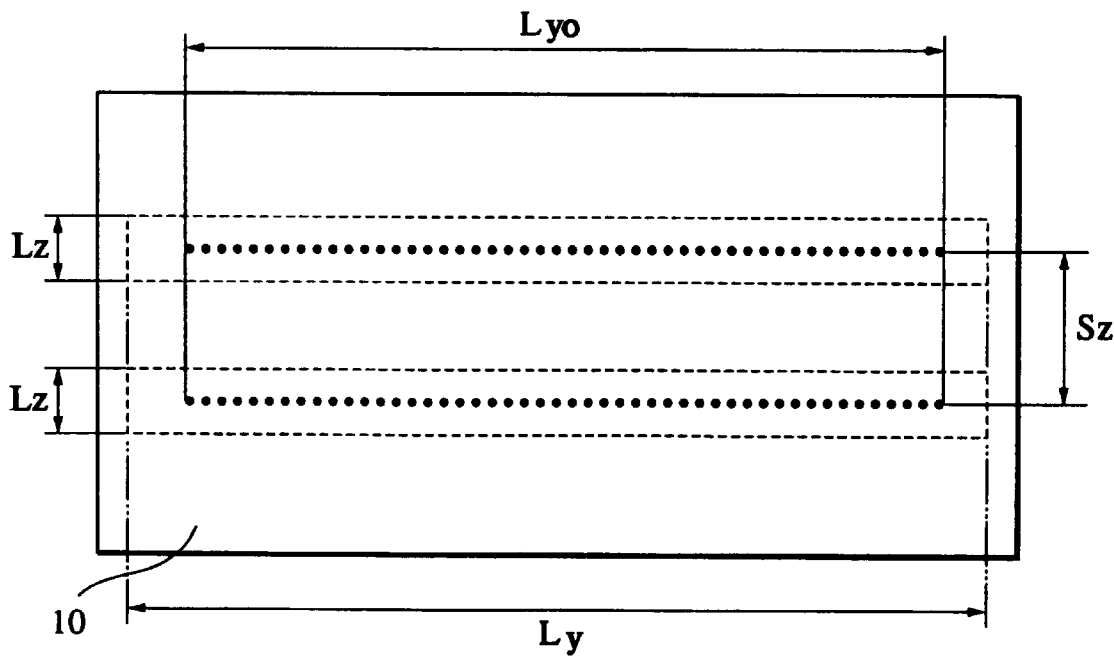

METHOD USED IN MANUFACTURING A WORKPIECE USING A PLURALITY OF SPACED APART MASK PATTERNS

BACKGROUND OF THE INVENTION

1. Field of the Invention

The present invention relates to an illuminating apparatus and the manufacturing method of a nozzle member.

2. Description of the Related Art

Precise components have been manufactured in the mask projection method these days. In this method, a workpiece is precisely machined with optical energy by projecting a pattern on the mask illuminated with a laser serving as a light source onto the surface to be machined with a projection lens. The method is superior in high productivity and stable, highly precise machining.

Among various types of component machining, laser machining with the mask projection method is suited to the drilling of an orifice plate (nozzle plate) used for an ink-jet printer or a bubble-jet printer (hereinafter collectively called ink-jet printers). In an ink-jet printer, ink is intermittently discharged from a number of small holes having a diameter of 20 to 50 $\mu$m arranged in a line onto a sheet to print characters and images. An orifice plate is a member having these many small holes (nozzles) which discharge ink. To increase the quality of printed characters, it is important to make a number of small holes on an orifice plate highly precisely as well as to precisely control the timing when ink is discharged.

If two or more lines of hole arrays can be made at the same time in drilling holes on an orifice plate, productivity in manufacturing orifice plates is drastically improved. Conventionally, however, there was no apparatus which can drill a plurality of hole arrays at the same time.

SUMMARY OF THE INVENTION

Accordingly, it is an object of the present invention to provide an illuminating apparatus which can illuminate a plurality of areas on a workpiece or a plurality of workpieces almost at the same time and to provide the manufacturing method of a nozzle member.

The above object of the present invention is achieved through the provision of an illuminating apparatus comprising: a first optical member for dividing a light beam emitted from a light source into a plurality of luminous flux on a first plane including the optical axis and for directing the plurality of luminous flux in different directions so that the plurality of luminous flux intersect at a first position; a second optical member for dividing each of the plurality of luminous flux, which intersects at the first position, into a plurality of segments on a second plane including the optical axis and perpendicular to the first plane and for directing the plurality of segments in different directions so that the plurality of segments intersects at a second position; and an anamorphic optical system for superimposing the plurality of luminous flux with each other for each of the plurality of segments on a plane to be illuminated and for forming a plurality of line-shaped illumination areas on the plane to be illuminated.

The above object of the present invention is also achieved through the provision of a manufacturing method of a nozzle member with the use of a plurality of mask patterns related to the nozzle, comprising the steps of: dividing a light beam emitted from a light source in order to form a plurality of illumination light beams; and illuminating each of the plurality of mask patterns with the corresponding illumination light beam among the plurality of illumination light beams in order to expose a workpiece to light through the plurality of mask patterns.

BRIEF DESCRIPTION OF THE DRAWINGS

FIGS. 4A and 4B are a front view of a mask.

FIG. 5 is a view showing the illumination area of the mask pattern.

DETAILED DESCRIPTION OF THE PREFERRED EMBODIMENT

Figure 1:
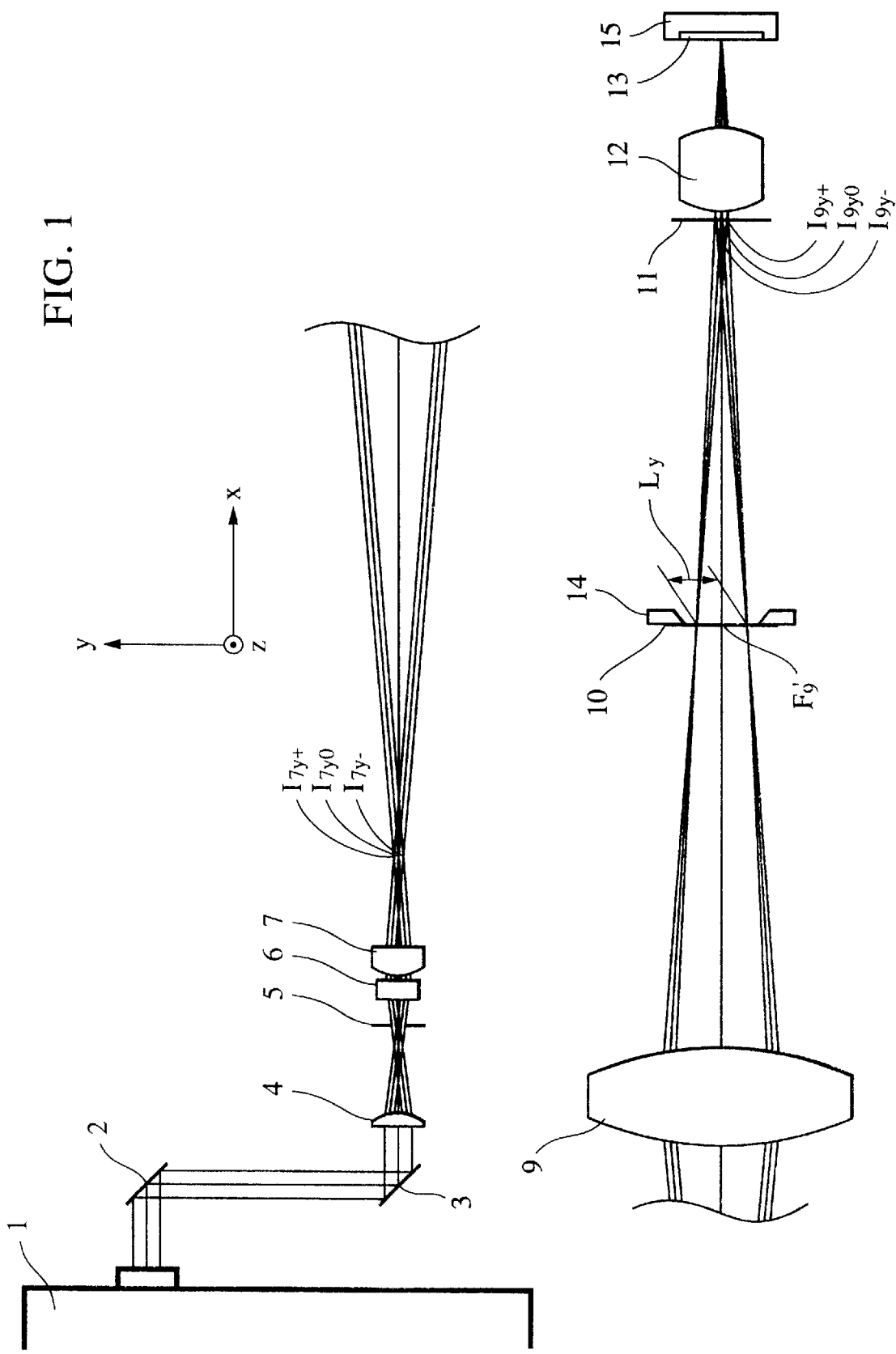
FIG. 1 is an outlined plan view of the main section according to a first embodiment of the present invention.
Figure 2:
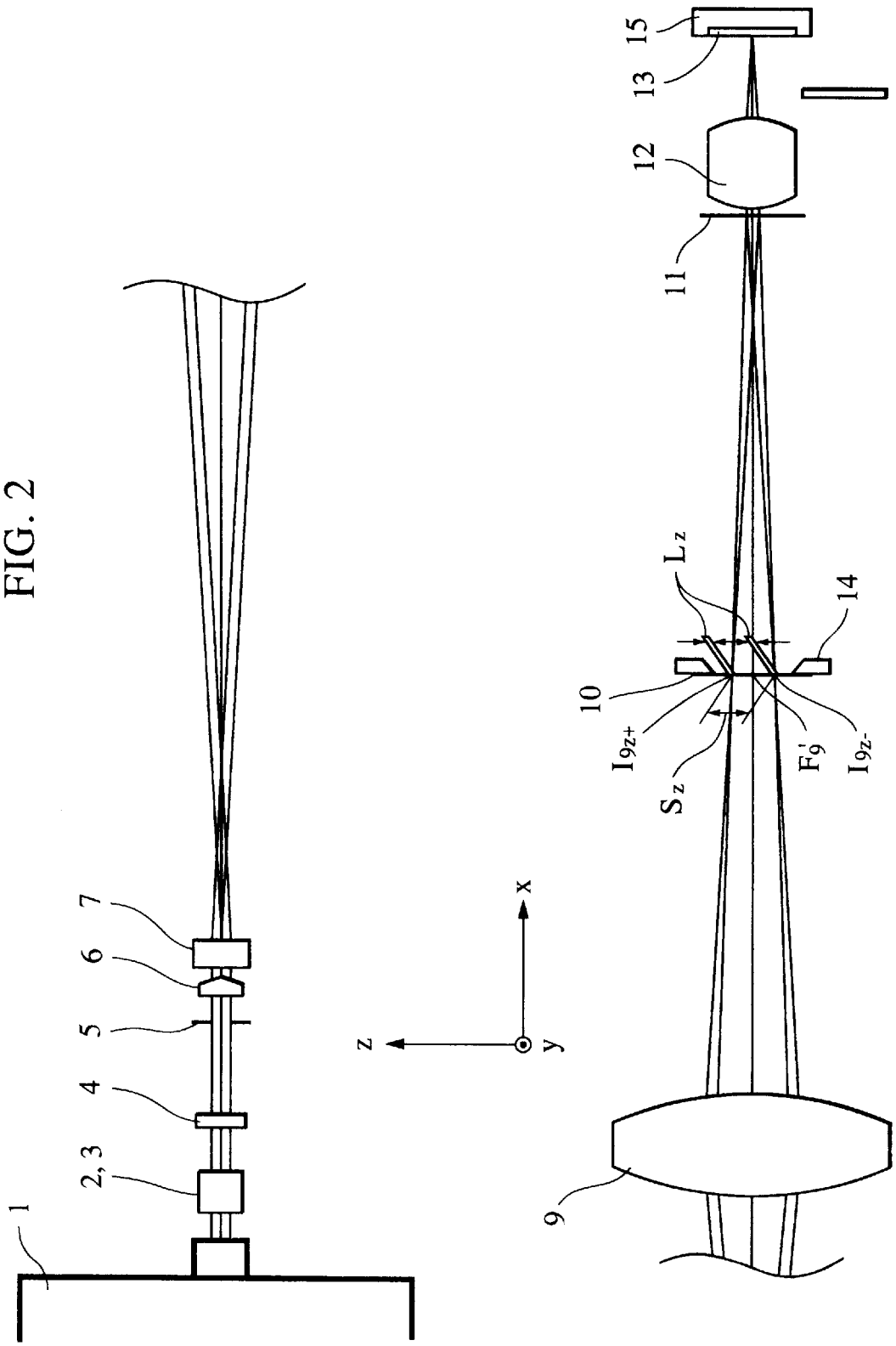
FIG. 2 is an outlined side view of the main section of the first embodiment of the present invention.

FIG. 1 is an outlined plan view of the main section of an illuminating apparatus according to a first embodiment of the present invention. FIG. 2 is a side view of the main section of the illuminating apparatus according to the first embodiment of the present invention. For convenience of description, an xyz coordinate system is set such that the x axis indicates the optical axis of an optical system, the x-y plane corresponds to the plan-view plane, and the x-z plane correspond to the side-view plane. Let the y-axis direction be called a first direction, the z-axis direction a second direction, the x-y plane a first plane (cross section), and the x-z plane a second plane (cross section).

In the figures, a light source (emitting source) 1 is, for example, a laser such as a KrF excimer laser. There is shown bending mirrors 2 and 3, y-direction luminous-flux dividing means 4 (first optical member) comprising a pair of prisms for dividing a beam of laser flux into three beams of luminous flux having different traveling directions on the x-y plane, a shielding mask 5, z-direction luminous-flux dividing means 6 (second optical member) comprising a pair of prisms for dividing a beam of laser flux into two beams of luminous flux having different traveling directions on the x-z plane, a first cylindrical lens 7 (anamorphic optical system) for converging light only in the y direction, a rotationally symmetric, convex lens 9 serving as a converging optical system for converging light usually in the y and z directions, and a mask 10 serving as a surface to be illuminated by an illumination beam. The mask 10 is disposed at a position substantially the same as the rear focal point $F_9'$ of the convex lens 9. There is also shown in the figures a projection lens 12 (projection optical system), an entrance pupil 11 of the projection lens 12 (sometimes, an aperture (stop) serves as an entrance pupil), and a workpiece 13, which is a pair of plates to be machined to make orifice plates (nozzle plates) of ink-jet printers in this embodiment. The workpiece 13 may be a plate. There is also shown a holding member 14 for the mask 10, and a holding member 15 for the workpiece (holding means for holding the first and second plates to be exposed to light). The projection lens 12 projects the image of a pattern on the mask 10 (mask-pattern) onto the surface of the workpiece 13 to be machined.

Figure 3A:
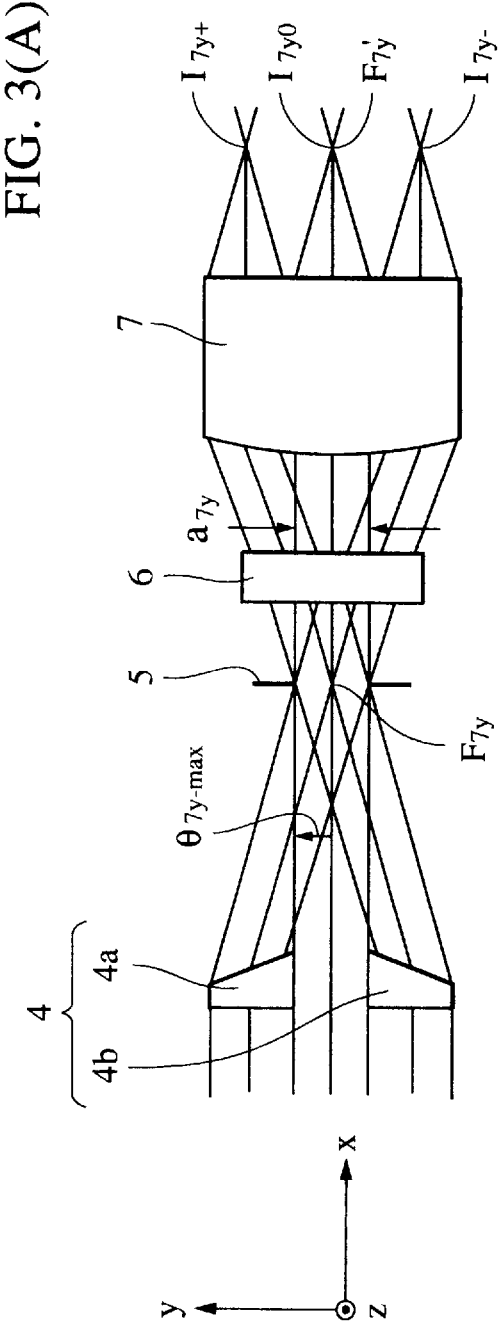
FIGS. 3(A) and 3(B) are detailed views of the section from Y-direction luminous flux dividing means 4 to a first cylindrical lens 7.
Figure 3B:
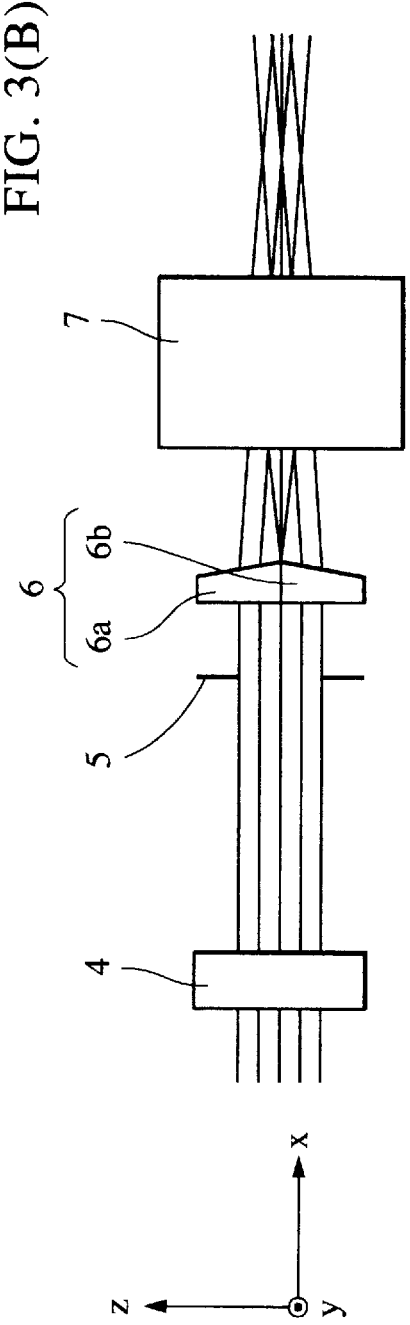

FIG. 3(A) is a plan view and FIG. 3(B) is a side view showing the details of a part of the y-direction luminous-flux dividing means 4, the shielding means 5, the z-direction luminous-flux dividing means 6, and the first cylindrical lens 7.

FIGS. 4A and 4B are a plan of the mask 10 according to this embodiment (FIG. 4B corresponds to reference numeral 4B in FIG. 4A). The mask 10 has a pattern in which transparent small holes having a diameter of $L_{z0}$ are provided at a regular interval along two parallel lines in the y direction on an opaque background. The length of the lines in the y direction is $L_{y0}$, the width of the small holes is $L_{z0}$, and the distance between the lines is $S_z$. The mask 10 is made by forming metal film (background) such as Chromium film on a transparent substrate. The pattern is formed in patterning. This pattern is used for making ink-discharging holes of a nozzle plate. The pattern is positioned in a mask pattern area.

In this embodiment, the pattern comprises two sets of separate patterns $P_i$ including a small-hole array formed long in the horizontal direction and in a tiny area of $L_{y0} \times L_{z0}$ in the vertical direction, disposed in parallel with a distance of $S_z$. Let the separate pattern $P_1$ in the figure be called a first pattern, and the separate pattern $P_2$ a second pattern.

A pair of the patterns on the mask 10 is projected onto the workpiece 13 (a pair of plates), and a number of small holes having a diameter of 20 to 50 μm is made on a line about 10 mm long on the workpiece at two positions.

Assuming that the projection magnification of the projection lens is ⅕, transparent holes having a diameter $L_{z0}$ of 0.1 to 0.25 mm are arranged in the lines 50 mm long on-the pattern (see FIG. 5).

The longitudinal direction (y direction) of the mask matches the directions in which the y-direction luminous-flux dividing means 4 divides a beam of luminous flux. The mask 10 is mounted to the mask-holding member 14 such that the center of the mask matches the x axis.

Operations in this embodiment will be described below. Since optical operations in this embodiment differ between these on the x-y plane and the x-z plane, they will be described separately.

Operations on the x-y plane (the first plane) will be first described by mainly referring to FIGS. 1 and 3(A). An almost collimated laser beam emitted in the optical-axis direction from the light source 1 is luminous flux having a cross section in which the width in the y direction is larger than that in the z direction. This luminous flux is reflected by the bending mirrors 2 and 3, and then is incident to the y-direction luminous-flux dividing means 4, which comprises two prisms 4a and 4b arranged in the y direction with a clearance between them as shown in FIG. 3(A). The y-direction luminous-flux dividing means 4 divides a beam of incident luminous flux into three beams of luminous flux having different traveling directions on the x-y plane.

The principal rays (central rays) of the three beams of divided luminous flux intersect at a point $F_{7y}$ (a first position) on the optical axis. The shielding mask 5, which has an opening at the center, is disposed at this point $F_{7y}$. The shielding mask 5 makes the widths of the three beams of divided luminous flux in the y direction equal and removes other stray light generated before the y-direction luminous-flux dividing means 4.

The shielding mask 5 is disposed at the front focal point $F_{7y}$ of the first cylindrical lens 7 (suffixes $_y$ and $_z$ indicate that the corresponding elements are those in the y and z directions, respectively). The principal rays of the three beams of luminous flux are emitted from the first cylindrical lens 7 in parallel to the optical axis. The mask 5 and the first cylindrical lens 7 compose a so-called telecentric optical system. Before the three beams of luminous flux are incident to the first cylindrical lens 7, they pass through the z-direction luminous-flux dividing means 6. In the z plane, the three beams of luminous flux is applied only an optical operation of the z-direction luminous-flux dividing means 6 serving as a parallel plane plate. After the three beams of luminous flux pass through the first cylindrical lens 7, they form three images (intermediate images on the x-y plane) $I_{7y+}$, $I_{7y0}$, and $I_{7y-}$ at the rear focal point $F_{7y}'$. These images are line-shaped images parallel to the z axis since the three beams of luminous flux spread in the x-z plane.

The convex lens 9 forms the three line-shaped images $I_{7y+}$, $I_{7y0}$, and $I_{7y-}$ again on the entrance pupil 11 of the projection lens 12 as images $I_{9y+}$, $I_{9y0}$, and $I_{9y-}$. Since the mask 10 is disposed at the rear focal point $F_9'$ of the convex lens 9, all the three beams of luminous flux overlap on the mask 10 in the x-y plane and they are not in focus on the mask 10. Let this length of the overlapped area (length of the illuminated area) be called $L_y$. The system is configured such that $L_y$ is large enough to cover length $L_{y0}$, which is the length of the mask patterns $P_1$ and $P_2$ in the y direction, as shown in FIG. 5.

The projection lens 12 forms an image of the patterns on the mask 10 onto the workpiece 13.

With the above-described configuration, the luminous flux emitted from the laser light source is divided into the three beams of luminous flux, they are focused to form the images (also serving as light sources) $I_{7y+}$, $I_{7y0}$, and $I_{7y-}$, and the images are then again formed on the entrance pupil 11 of the projection lens 12 as $I_{9y+}$, $I_{9y0}$, and $I_{9y-}$, on the x-y plane in this embodiment. Köhler illumination is implemented and the whole part of the mask pattern is uniformly illuminated in the y direction.

The focal length $f_{7y}$ of the first cylindrical lens 7 is determined by the diameter $a_{7y}$ in the y direction of the luminous flux incident to the lens 7, the focal length $f_9$ of the convex lens 9, and the length $L_y$ of the illuminated area on the mask 10. In other words, the focal length $f_{7y}$ of the first cylindrical lens 7 is expressed as follows with magnification $m_{9y}$ with which the line-shaped images $I_{7y+}$, $I_{7y0}$, and $I_{7y-}$ formed by the first cylindrical lens 7 are again formed on the entrance pupil 11 by the convex lens 9 and the distance $b_{9y}$ from the rear principal plane of the convex lens 9 to the entrance pupil 11 of the projection lens 12.

$$f_{7y} = a_{7y} * \{(b_{9y} - f_9)/L_y\} * |1/m_{9y}| \qquad (1)$$

where * indicates multiplication.

It is preferred that the length $L_y$ of the illuminated area on the mask 10 be about equal to or longer by about 20% than the length $L_{y0}$ of the mask patterns $P_1$ and $P_2$ in the y direction. This condition is expressed as follows;

$$L_{y0} \leq L_y \leq 1.2 * L_{y0} \qquad (2)$$

To implement this condition, the focal length $f_{7y}$ of the first cylindrical lens 7 is determined with $a_{7y}$, which is the width of the luminous flux incident to the first cylindrical lens 7, ranging from $a_{7y}$ to $a_{7y}/1.2$, and luminous flux having width $a_{7y}$ is actually incident to the lens. Namely, $f_7$ shall be determined as follows;

$$f_{7y} = k * a_{7y} * \{(b_{9y} - f_9)/L_{y0}\} * |1/m_{9y}| \qquad (3)$$

where * indicates multiplication and k ranges from 1 to 1/1.2.

The conditions for the two prisms 4a and 4b, which compose the y-direction luminous-flux dividing means 4, is next obtained from the result. The angle of the luminous flux emitted from the y-direction luminous-flux dividing means 4 is determined by the focal length $f_{7y}$ of the first cylindrical lens 7, the diameter $A_{11}$ of the entrance pupil 11 of the projection lens 12, and the magnification $m_{9y}$ of the convex lens in the y direction.

The following condition shall be satisfied in order to form the three line-shaped images $I_{7y+}$, $I_{7y0}$, and $I_{7y-}$ in the entrance pupil 11 (aperture).

$$\tan(\theta_{7y-max}) \leq (A_{11}/2)/(f_{7y}*m_{9y}) \qquad (4)$$

where * indicates multiplication and $\theta_{7y-max}$ is the angle formed between the optical axis and the luminous flux emitted from the y-direction luminous-flux dividing means 4 in the oblique direction, as shown in FIG. 3.

The two prisms 4a and 4b shall have a deviation angle of $\theta_{7y-max}$ obtained from expression (4).

To determine an optical arrangement, the optical operation of the z-direction luminous-flux dividing means 6, described below, must be taken into consideration.

The above description has explained the operations of this embodiment in the x-y plane.

By referring to FIGS. 2 and 3(B), operations in the x-z plane (the second plane) will be described next.

In the x-z plane, the y-direction luminous-flux dividing means 4 serves against incident luminous flux simply as a parallel plane plate. A laser beam emitted from the light source 1 passes through the y-direction luminous-flux dividing means 4 and the shielding mask 5, and is incident to the z-direction luminous-flux dividing means 6. As shown in FIG. 3(B), the z-direction luminous-flux dividing means 6 comprises two prisms 6a and 6b arranged in the z direction. It divides incident luminous flux into two collimated beams of luminous flux proceeding in two different directions on the x-z plane. The two beams of luminous flux are not affected, not converged nor diverged, by the first cylindrical lens 7 in the z direction. Instead of the lens 7, a lens having convergence and divergence operations in the y and z directions with different refractive power (focal lengths) in the y and z directions may be used.

The two divided collimated beams of luminous flux are incident to the convex lens 9, pass through it, and then form images $I_{9z+}$ and $I_{9z-}$ at the mask 10 disposed at the bask focus $F_9'$ of the convex lens 9. These images extend in the y direction as shown in FIG. 5 and are line-shaped images with a length of $L_y$. The distance between the two images is $S_z$.

The projection lens 12 forms an image of the pattern on the mask 10, which is illuminated by the source as small as a point in the z direction, onto the workpiece 13.

The apex angle (wedge angle) of the prisms 6a and 6b, composing the z-direction luminous-flux dividing means 6, is determined according to the following relationship. Since the deviation angle of the prisms 6a and 6b equals the incident angle $\theta_{9z}$ of the collimated beams of luminous flux to the convex lens 9, the following relationship is obtained.

$$\tan \theta_{9z} = (S_z/2)/f_{9z}$$

The prisms 6a and 6b shall have a deviation angle of $\theta_{9z}$. The prisms are disposed such that the principal rays of the two beams of luminous flux divided in the z direction intersect with the optical axis at the rear focal point $F_{7y}'$ (the second position) of the first cylindrical lens 7. Since the convex lens 9 forms the line-shaped images $I_{7y+}$, $I_{7y0}$, and $I_{7y-}$ on the entrance pupil of the projection lens 12, when the beams of luminous flux divided in the z direction intersect with the optical axis at $F_{7y}'$, the projection lens 12 does not eclipse the luminous flux.

The width $L_z$ of the line-shaped images $I_{9z+}$ and $I_{9z-}$, formed on the mask 10, in the z direction is obtained from the following equation with the divergence angle w of the light source 1 and the focal length $f_9$ of the convex lens 9.

$$L_z = w * f_9 \qquad (5)$$

From experiments, the following $L_z$ causes good results.

$$3 * L_{z0} \leq L_z \leq 30 * L_{z0} \qquad (6)$$

In other words, in the z direction, the focal length of the convex lens 9 shall be determined according to equation (5) from the divergence angle w of the light source 1 and the desired width $L_z$ of an illuminated area.

The dimensions and shape of the entrance pupil 11 shall be determined appropriately with the shape of the images $I_{9y-}$, $I_{9y0}$, and $I_{9y+}$ formed on the entrance pupil, which are rectangular as a whole, being taken into consideration.

With the above-described configuration, in this embodiment, line-shaped images are formed with the laser beam in the z direction to implement Critical illumination so that the dimension $L_{z0}$ in the z direction of the two line-shaped patterns $P_1$ and $P_2$ made on the mask 10 as shown in FIG. 5 is sufficiently covered. The mask pattern is projected onto the workpiece to be machined with illumination having an extremely high energy density.

In this embodiment, Köhler illumination, which illuminates the mask patterns uniformly, is implemented in the x-y plane with the length of the patterns in the y direction being sufficiently covered, and Critical illumination, which forms the images with the luminous flux emitted from the light source within an area which appropriately covers the lengths in the z direction of the mask patterns disposed on the two parallel lines, is implemented in the z direction. With this configuration, the present embodiment provides a projection apparatus which has more superior efficiency in using energy than that in a conventional laser machining optical system and which can machine two workpieces at the same time, with two line-shaped illuminated areas being formed on the mask 10.

The cylindrical lens 7 comprises one cylindrical lens in this embodiment. It may comprise a plurality of cylindrical lenses, as required. The convex lens 9 also comprises one lens in this embodiment. It may comprise a plurality of lenses, as required.

The divergence angle w of the laser beam is an important factor for determining the illumination width $L_z$ in the z direction. Therefore, a lens for controlling the divergence angle W and beam-diameter adjustment unit such as a zoom lens, may be disposed between the laser light source and the y-direction luminous-flux dividing means in order to control the divergence angle w.

In this embodiment, the y-direction luminous-flux dividing means comprises the two prisms and divides the luminous flux into the three beams of luminous flux. It may comprise the larger number of prisms and divide the luminous flux into the larger number of beams, as required.

Also in this embodiment, the z-direction luminous-flux dividing means comprises the two prisms and divides the luminous flux into the two beams of luminous flux in the z direction. When three or more mask patterns are used, or a plurality of mask patterns is arranged on a line, the number of prisms may be increased to increase the number of divisions or the z-direction luminous-flux dividing means may have the same structure as the y-direction luminous-flux dividing means 4, respectively.

When the projection apparatus according to the present embodiment is applied to the manufacturing of orifice plates (nozzle plates), and then, to that of ink-jet printers, two orifice plates can be machined at one exposure with high productivity without increasing the output of a laser light source, enabling orifice plates and bubble-jet printers to be made at lower cost.

The present embodiment describes the projection apparatus for making lines of ink-charging holes on a substrate. The present invention is not limited to hole making, and can be used for forming a device pattern distributed on lines on one or a plurality of substrates at the same time to manufacture devices. Also in this application, a plurality of devices can be machined at the same time with one exposure, obtaining high productivity.

In the above-described embodiment, when a light source other than a laser is used, luminous flux emitted from the light source is made substantially parallel and then input to the y-direction luminous-flux dividing means 4. The luminous flux incident to the y-direction luminous-flux dividing means 4 shall be larger than the effective portion of the y-direction luminous-flux dividing means 4.

An optical system for enlarging and reducing luminous flux is not disposed between the light source 1 and the y-direction luminous-flux dividing means 4 in this embodiment. Such an optical system may be disposed as far as luminous flux sufficiently covers the effective portion of the y-direction luminous-flux dividing means 4.

Mask patterns may be directly projected onto a workpiece to be machined without using the projection lens 12.

With the above-described configuration, the present embodiment has the following advantages.

An illuminating apparatus or a projection apparatus suitable for a laser machining optical system which can illuminate a plurality of line-shaped patterns with extremely high efficiency in using energy (using light) is implemented.

A projection apparatus for high-precision laser machining is implemented with simple configuration by using y-direction luminous-flux dividing means and z-direction luminous-flux dividing means without using a fly-eye lens.

A manufacturing method of orifice plates is implemented which drastically increases productivity in machining parts by machining two workpieces at one machining operation and reduces the cost.

A low-cost ink-jet printer is implemented with the use of a low-cost orifice plate.

What is claimed is:

1. A method used in manufacturing a workpiece using a plurality of spaced apart mask patterns, comprising:

a first step of dividing a light beam emitted from a light source into a plurality of light beams on a first plane including a first direction;

a second step of dividing each of the plurality of light beams into a plurality of light beams on a second plane perpendicular to the first plane, the second plane including a second direction perpendicular to the first direction; and a third step of focusing the plurality of light beams produced by said second step only in the first direction; and a fourth step of focusing the plurality of light beams focused in said third step in the first direction at a position beyond the plurality of mask patterns in the second direction so that light beams focused in said third step overlap each other to form a plurality of spaced apart images each of which illuminate one of the plurality of spaced apart mask patterns.

2. A method according to claim 1, wherein the workpiece is a plurality of plates, wherein each of said plurality of mask patterns has a plurality of small openings arranged in the first direction, and wherein said method further comprises the step of passing the light of the images through the plurality of small openings of said plurality of mask patterns to the plates to form nozzles in each of the plates corresponding to the plurality of small openings.

3. A method according to claim 2, wherein said plurality of spaced apart images extend in said first direction and have an elongated shape.

4. A method according to claim 3, wherein said plurality of spaced apart mask patterns are arranged parallel with each other in the second direction perpendicular to said first direction.

5. A method according to claim 4, wherein said plurality of mask patterns are on a common substrate.

6. A method according to claim 5, further comprising the step of passing the light from the images through said plurality of mask patterns to fall on different positions on the same workpiece.

7. A method according to claim 5, further comprising the step of passing the light from the images through said plurality of mask patterns to fall on different workpieces.

8. A method according to claim 5, further comprising the step of directing the light beams divided by said second dividing step toward said plurality of mask patterns through a common optical system.

9. A method according to claim 5, further comprising the step of directing light from the images through said plurality of mask patterns toward said workpiece through a projection optical system, thereby forming images of said plurality of mask patterns on said workpiece.

10. A manufacturing method according to claim 9, wherein said first step divides a light beam emitted from an excimer laser light source.

11. A manufacturing method according to claim 1, wherein said first step divides a light beam emitted light from a laser light source.

12. A method according to claim 1, wherein the workpiece is a pair of orifice plates of an ink-jet printer, said method further comprising the step of passing light from the images through said plurality of mask patterns onto the orifice plates to form nozzles in each of the orifice plates.

* * * * *

UNITED STATES PATENT AND TRADEMARK OFFICE
CERTIFICATE OF CORRECTION

PATENT NO. : 5,841,101

DATED : November 24, 1998

INVENTOR : MASAYUKI NISHIWAKI

It is certified that error appears in the above-identified patent and that said Letters Patent is hereby corrected as shown below:

ON THE COVER PAGE item [57], in the ABSTRACT, line 16, "illuminate" should read --illuminates--.

COLUMN 1:

line 55, "intersects" should read --intersect--.

COLUMN 2:

line 33, "is" should read --are--;
    line 50, "is" should read --are--; and
    line 56, "is" should read --are--.

COLUMN 4:

line 2, "is applied only an" should read --are applied only to an--;
    line 50, "follows;" should read --follows:--; and
    line 58, "follows;" should read --follows:--.

UNITED STATES PATENT AND TRADEMARK OFFICE
CERTIFICATE OF CORRECTION

PATENT NO. : 5,841,101

DATED : November 24, 1998

INVENTOR : MASAYUKI NISHIWAKI

It is certified that error appears in the above-identified patent and that said Letters Patent is hereby corrected as shown below:

COLUMN 5:

line 41, "bask" should read --back--.

COLUMN 6:

line 1, "L," should read --$L_z$--.

COLUMN 7:

line 55, "direction; and" should read --direction;--.

COLUMN 8:

line 8, "images" should read --images,-- and "illuminate" should read --illuminates--.

Signed and Sealed this

Sixth Day of July, 1999

Q. TODD DICKINSON

*Attest:*

*Attesting Officer*　　*Acting Commissioner of Patents and Trademarks*